United States Patent
Sekhar

(10) Patent No.: US 8,553,603 B2
(45) Date of Patent: Oct. 8, 2013

(54) CLIENT BRIDGE BETWEEN WIRED AND WIRELESS COMMUNICATION NETWORKS

(75) Inventor: Ramesh V. Sekhar, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 189 days.

(21) Appl. No.: 13/156,823

(22) Filed: Jun. 9, 2011

(65) Prior Publication Data

US 2012/0314634 A1    Dec. 13, 2012

(51) Int. Cl.
*H04W 52/02*    (2009.01)

(52) U.S. Cl.
USPC .......................................... 370/311

(58) Field of Classification Search
USPC .................................. 370/254–340
See application file for complete search history.

(56) References Cited

U.S. PATENT DOCUMENTS

| | | | |
|---|---|---|---|
| 6,067,297 A * | 5/2000 | Beach ............................ | 370/389 |
| 2006/0165073 A1 | 7/2006 | Gopinath et al. | |
| 2007/0135866 A1 * | 6/2007 | Baker et al. ...................... | 607/60 |
| 2008/0130603 A1 | 6/2008 | Wentink et al. | |
| 2008/0212724 A1 * | 9/2008 | Grabon et al. ................ | 375/346 |
| 2010/0054215 A1 | 3/2010 | Stahl et al. | |
| 2012/0087315 A1 * | 4/2012 | Sivaprakasam ............... | 370/329 |

FOREIGN PATENT DOCUMENTS

WO    2007143554 A2    12/2007

OTHER PUBLICATIONS

International Search Report and Written Opinion for International Patent Application No. PCT/US2012/038791 issued on Sep. 26, 2012.

* cited by examiner

*Primary Examiner* — Phirin Sam
*Assistant Examiner* — Debebe Asefa
(74) *Attorney, Agent, or Firm* — Brian M. Mancini

(57) ABSTRACT

A method and client bridge for bridging clients between a wired and wireless communication network includes a radio transceiver with a register and a controller for indicating to the wireless network that all wired client devices of the wired network are in Power Save Polling (PSP) mode, selecting the next wired client to be indicated as being in Continuously Awake Mode (CAM) mode, storing a Media Access Control (MAC) address of that selected client in the register, indicating to the wireless network that the selected client is in CAM mode, receiving any packets from the wireless network, which are acknowledged using the register, indicating to the wireless network that the selected client is back in PSP mode, and repeating these operations until all wired client communications are serviced.

15 Claims, 2 Drawing Sheets

CLIENT BRIDGE BETWEEN WIRED AND WIRELESS COMMUNICATION NETWORKS

FIELD OF THE DISCLOSURE

The present invention relates generally to communication networks and more particularly to a client bridge between wired and wireless communication networks.

BACKGROUND

Client bridges (CB) are used to connect a wired communication network (e.g. Ethernet) to a wireless communication network (e.g. IEEE 802.11). A problem to be addressed by client bridges is to make wired clients on the Ethernet side of the CB appear as wireless IEEE 802.11 clients, each associated to an access point across the IEEE 802.11 air interface. To accomplish this, the CB needs to transmit and receive wireless packets on its wireless IEEE 802.11 radio on behalf of each of their wired clients. This includes returning Acknowledgment (ACK) messages of various types within the limits specified by IEEE 802.11n when an IEEE 802.11 packet is received.

Current IEEE 802.11 radios implement Acknowledgements (ACK), Block-Acknowledgements (BLOCK-ACK), and Clear-To-Send (CTS) Indications in hardware (i.e. a hardware radio register), because doing it in software is infeasible owing to tight time constraints needed for this messaging. Specifically, BLOCK-ACKs require that a bitmap be generated for every single received packet in an Aggregated MAC Protocol Data Unit (AMPDU) aggregate frame. This can be time-consuming and easily exceed the nine-microsecond acknowledge response time mandated by IEEE 802.11. Moreover, hardware implementations only acknowledge packets whose destination Media Access Control (MAC) address has been pre-programmed. Further, these implementations can only accept one MAC address at a time, or MAC addresses that are contiguous in some IEEE 802.11 configurations. However, contiguous addressing would require address translation on the MAC addresses to map to a block of contiguous addresses. There are two problems with this: (1) the address block being translated to, has to be managed carefully so as to not cause conflicts with other address blocks, which means additional overhead of address coordination across different client bridges, and (2) proprietary layer-2 protocols that rely on the MAC address being the same as the external MAC address will not work correctly, which could be resolved by a reverse-translation on the AP, but that would mean that both the CB and a modified access point would need to agree on a translation mechanism using a control protocol of some sort, which is not available to all CB systems.

These limitations makes client bridges very difficult to implement, since client bridges cannot use the radio hardware to acknowledge packets for several different wired MAC addresses since it can only use the radio hardware to ACK one of these MAC addresses and generate the rest of the ACK messages in software. However, generating IEEE 802.11 ACK, BLOCK-ACK, and CTS messaging in software will considerably impact packet-bridging performance of the CB, rendering the CB very slow for even average size deployments, unless a very powerful CPU is used in the CB, which increases its cost prohibitively.

What is needed is a technique for a client bridge to reliably serve the needs of a plurality of wired client MAC addresses communicating with a wireless 802.11 network. Also, it would be of benefit for the radio hardware of the client bridge to generate real time responses to incoming radio packets.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
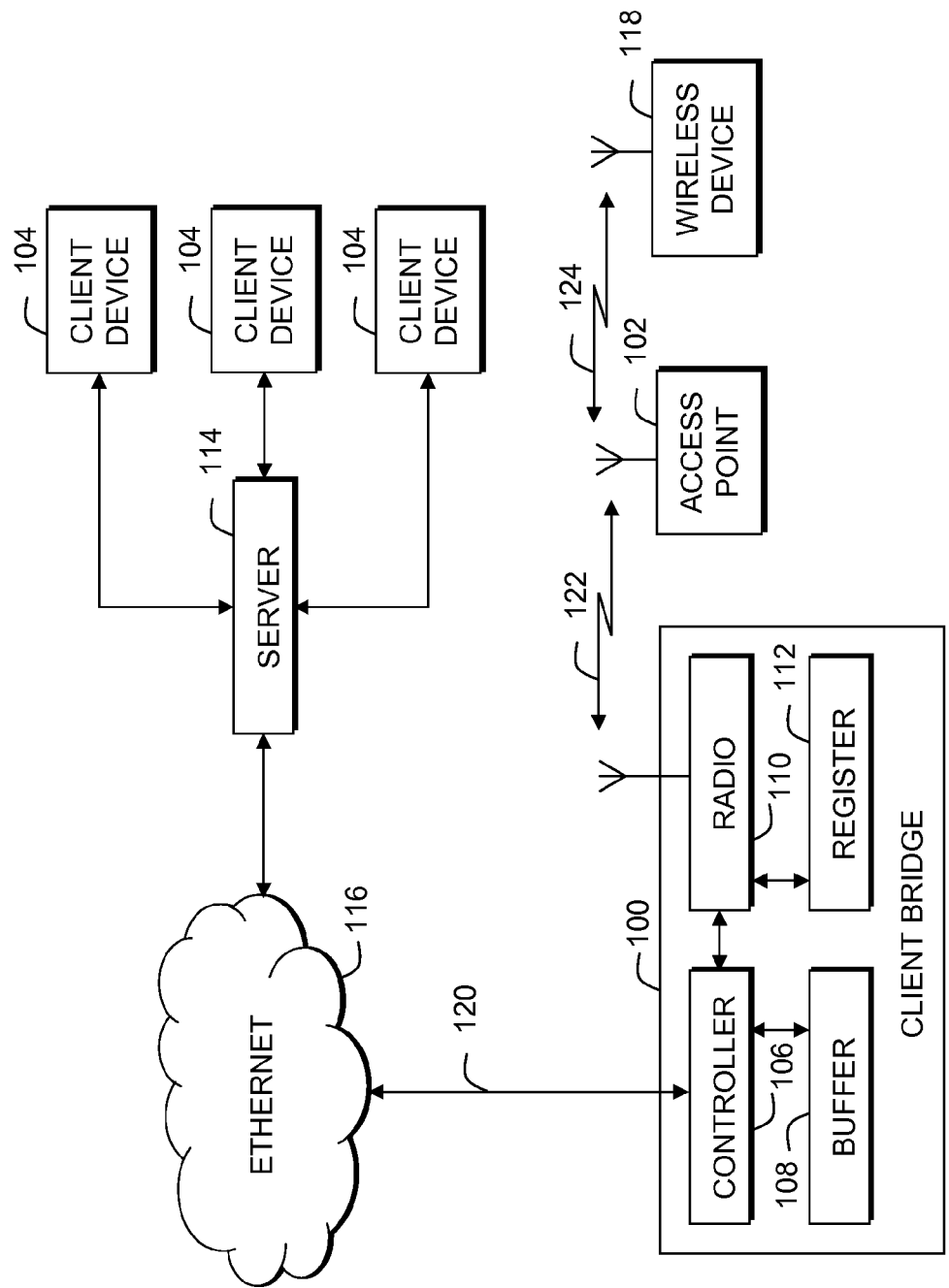
FIG. 1 is a simplified block diagram of a client bridge, in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention provides a novel technique for a client bridge to reliably serve the needs of a plurality of wired MAC addresses communicating with a wireless network. The present invention also provides radio hardware of the client bridge that generates real time responses to incoming radio packets. In particular, the present invention shares the radio hardware register of the CB by placing a single MAC address of one wired client device in the register and indicating to the wireless network that the remaining wired client devices are in Power Save Polling (PSP) mode, even though they may not actually be in PSP mode. The MAC address of each wired client is then stored in the register in turn, while indicating to the wireless network that that particular wired client is in Continuously Aware Mode (CAM) mode. Scheduling of each wired client is based on traffic volume and priority. The present invention is suited for client bridge deployments that desire IEEE 802.11n-comparable performance without using an expensive processor to implement software-based ACKs and BLOCK-ACKs, and for interoperability with the broadest range of wireless access points.

The figures of the present invention show various assemblies adapted to support the inventive concepts of the embodiments of the present invention. Those skilled in the art will recognize that these figures do not depict all of the equipment necessary for the device and display to operate but only those components particularly relevant to the description of embodiments herein. For example, the device can include separate processors, controllers, communication interfaces, transceivers, memories, etc. In general, components such as processors, controllers, drivers, memories, and interfaces are well-known. For example, processing and controller units are known to comprise basic components such as, but not limited to, microprocessors, digital signal processors, microcontrollers, computers, drivers, memory devices, application-specific integrated circuits, and/or logic circuitry. Such devices are typically adapted to implement algorithms and/or protocols that have been expressed using high-level design languages or descriptions, expressed using computer instructions, expressed using messaging/signaling flow diagrams, and/or expressed using logic flow diagrams. Thus, given an algorithm or logic flow, those skilled in the art are aware of the many design and development techniques available to implement user equipment that performs the given logic. Therefore, the processors, controller, and drivers represent a known apparatus that has been adapted, in accordance with the description herein, to implement various embodiments of the present invention.

Those skilled in the art are aware of the many design and development techniques available to configure a processor and a controller that implement the present invention. Therefore, the entities shown represent a known system that has been adapted, in accordance with the description herein, to implement various embodiments of the present invention. Furthermore, those skilled in the art will recognize that aspects of the present invention may be implemented in and across various physical components and none are necessarily limited to single platform implementations. It is within the contemplation of the invention that the operating requirements of the present invention can be implemented in software, firmware or hardware, with the function being implemented in a controller (or a digital signal processor) being merely an option.

Referring to FIG. 1, a client bridge 100 is shown, in accordance with the present invention. The device 100 can include a controller 106, a radio transceiver 110, a buffer 108, and a radio hardware register 112. The entities shown can be incorporated into one module or a plurality of modules. The client bridge provides and controls a connection between a wired communication network and a wireless communication network. The wired communication network can include a plurality of devices 104 that communicate with the client bridge 100 via Ethernet 116. The client bridge 100 can be in communication directly with the wired client devices 104 or through a server 114. The wireless communication network can include at least one access point 102 serving at least one wireless device 118. In the example described herein, wireless communication occurs through an IEEE 802.11n air interface 122, 124. However, it should be recognized that the present invention is applicable to any wired/wireless client bridge application and communication protocols.

In accordance with the present invention, the controller 106 of the client bridge controls simultaneous communications (i.e. simultaneous on-going calls) between the plurality of wired client devices 104 and the wireless access point 102. In particular, the controller selects only one of the wired client devices to communicate with the access point at a time. The controller obtains the MAC address for the one selected wired device and stores that address in the radio hardware register 112. The controller then indicates to the access point that this selected wired device, identified by its MAC address, is operating in CAM mode and the remaining plurality of wired client device are operating in PSP mode, even though this may not be true. In this way, it is ensured that only one wired client device is bridged at a time by the client bridge, and during that time, only its address is stored in the hardware register 108.

In effect, the client bridge impersonates the one selected wired client device by using that device's MAC address and without using the client bridge's own MAC address. The client bridge associates with the access point as a wireless device using the MAC address of the one selected wired client device. Since the MAC address of the one selected wired client device is stored on a radio hardware register, if packet is received by the client bridge from the access point with that MAC address, then hardware register can immediately acknowledge the packet or packet block (while dropping any other packets received from the access point that do not have that MAC address).

The client bridge also sends indications to the access point that the selected wired client device is in CAM mode and that the other wired client devices are in PSP mode, even if that may not be true. In the meantime, the other wired client devices believe that they are still in communication with the access point and are still delivering packets to the client bridge. The client bridge buffers these packets in its buffer. Similarly, if the access point has packets to be delivered to any of these other wired client devices, it has received an indication that these other wired client devices are asleep in PSP mode and buffers their packets until the access point receives an indication that one of these other wired client devices is now in CAM mode. In this way, the access point and wired client devices do not know anything has changed and do not need to change their behavior.

For example, if a client bridge (CB) 100 is used on a wired segment 120 which connects to three wired client devices 104, that CB can make these three wired client devices appear as three wireless client devices to the access point 102, one at a time. The three wired client devices 104 can be simultaneously communicating with one or more wireless clients 118 on the other side of the access point 102. The present invention temporarily interrupts these simultaneous communications as described herein. In this scenario, the controller 106 would direct the radio transceiver to indicate to the wireless communication network that two out of the three wired client devices 104 in PSP mode at any given time, and that one selected wired client is awake in CAM mode. The controller 106 keeps this wired client device awake for a period sufficient for the amount of data traffic it needs to deliver or receive, and then indicates to the access point that the selected wired client back is now in PSP mode. The controller 106 then selects the next wired client out of the remaining two clients, programs that client's MAC address into the radio hardware register of the radio transceiver, and directs the radio transceiver to indicate to the access point that that client is now in CAM mode by sending a CAM indication. During the time that this wired client is indicated as awake, all acknowledgements for packets sent to this client by the access point will be generated in the register 110, thus allowing the client to take advantage of IEEE 802.11n data rates to maximize performance.

In this way, the present invention gets around the hardware restriction that prevents providing ACK messages to more than one wired client device back-to-back. It should be noted that the controller 106 can buffer data in its buffer 108 for the wired-to-wireless data path direction, and the access point 102 can be forced to buffer data for the wireless-to-wired data path direction, for those wired clients indicated as in PSP mode.

Central to the present invention is that only one wired client transmits or receives data at a time. The selection criterion for which wired client are indicated as being into CAM or PSP mode can be any contemporary scheduling scheme that accounts for fairness, traffic class and other parameters considered important for the traffic or client being used. Such scheduling can be performed in a scheduler that could be part of the controller 106.

Figure 2:
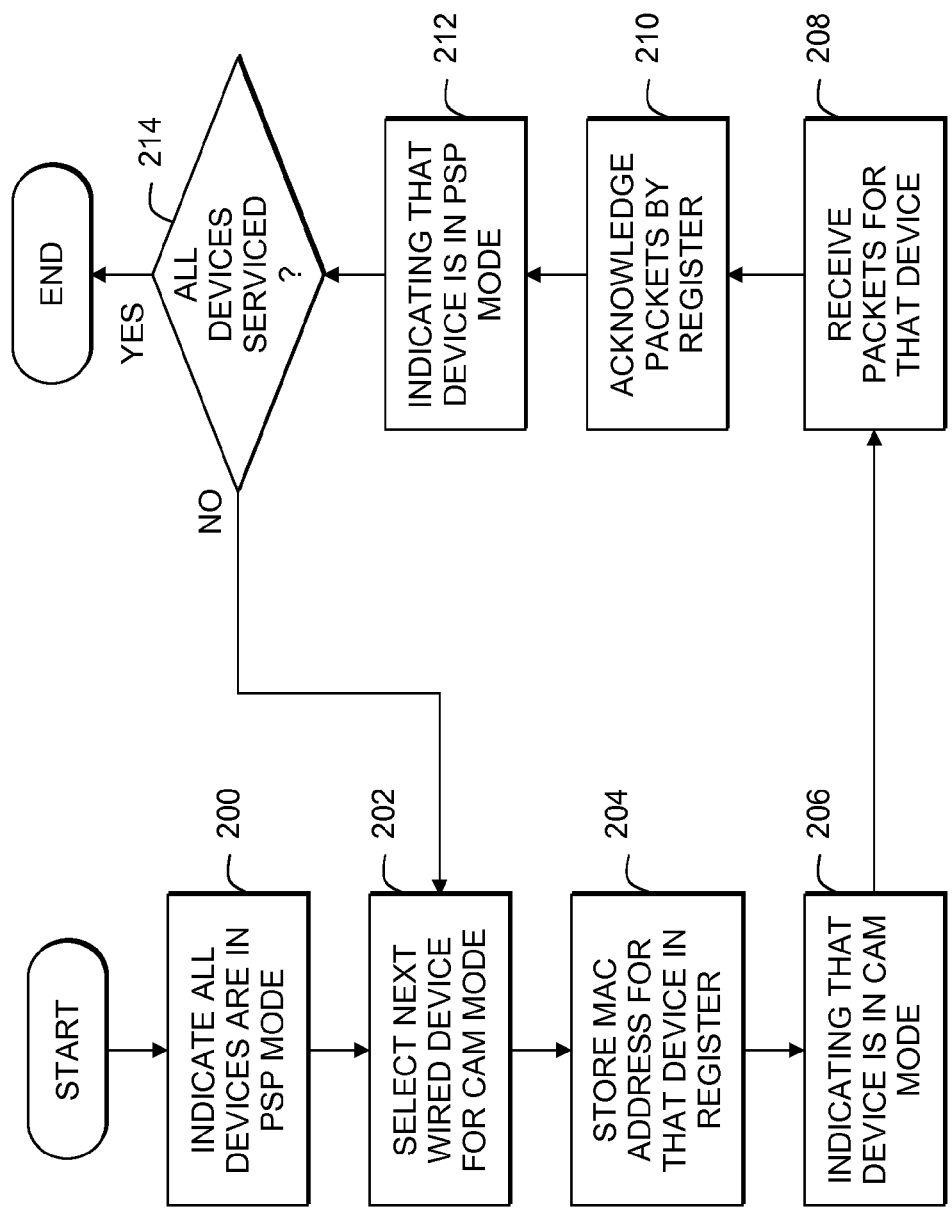
FIG. 2 is a simplified block diagram of a method, in accordance with the present invention.

FIG. 2 illustrates a flowchart of a method for bridging clients between a wired and wireless communication network, in accordance with the present invention. The method includes a first step 200 of indicating to (an access point of) a wireless communication network that all wired client devices are in Power Save Polling (PSP) mode where multiple wired client devices require simultaneous communication with the wireless communication network.

A next step 202 includes selecting the next wired client device to be indicated to (the access point of) the wireless communication network as being in Continuously Awake Mode (CAM) mode, based on a pre-defined scheduling scheme in use by the client bridge.

A next step 204 includes storing the MAC address of that next wired client in a radio hardware register of the client bridge, so that packets received from the access point for that MAC address will be acknowledged by the radio hardware itself.

A next step 206 includes indicating to the wireless communication network that that next wired client is in CAM mode by sending a CAM mode indication for that MAC address to the wireless communication network. This includes the client bridge associating with the wireless communication network as a wireless device having the MAC address of that selected next wired client device.

A next step 208 includes receiving any packets from (the access point of) the wireless communication network having the MAC address of the selected next wired client device.

A next step 210 includes acknowledging those received packets by the client bridge radio hardware register to the wireless communication network. Of course, if the client bridge does not properly receive a packet, it can send a not-acknowledged (NACK) message to the wireless communication network in order to receive a retransmission of the packet, using known procedures. This step includes exchanging packets between the selected next wired client device and the wireless communication network, including any packets buffered in the access point for the next wired client device and any packets buffered in the client bridge buffer for delivery to the wireless communication network. Of course, if the wireless communication network does not properly receive a packet, it can send a not-acknowledgement (NACK) to the client bridge hardware in order to receive a retransmission of the packet, using known procedures. These actions include waiting a sufficient amount of time for providing and completing this wired-to-wireless communication network exchange of data packets.

A next step 212 after data exchange is indicating to the wireless communication network that the next wired client is now in PSP mode by sending a PSP mode indication for that MAC address to the wireless communication network.

A next step 214 includes returning to step 202 and repeating the steps until all the simultaneously required wired client device communications are serviced.

Advantageously, the present invention provides a hardware technique that allows only one wired client to transmit or receive data at a time. This provides the faster hardware speeds without the delays due to MAC address software processing.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits, in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs for ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A client bridge between a wired and wireless communication network, comprising:
   a radio transceiver;
   a hardware register of the radio transceiver; and
   a controller coupled to the radio transceiver, wherein the controller is operable to direct the radio transceiver to indicate to the wireless communication network that all wired client devices of the wired communication network are in Power Save Polling (PSP) mode, select the next wired client to be indicated as being in Continuously Awake Mode (CAM) mode, store a Media Access Control (MAC) address of only that next wired client in the register, direct the radio transceiver to indicate to the wireless communication network that the next wired client is in CAM mode, wherein the radio transceiver is operable to receive any packets from the wireless communication network addressed to the next wired client, and acknowledge the received packets using an acknowledgement generated in the register, and wherein the controller is also operable to direct the radio transceiver to indicate to the wireless communication network that the next wired client is back in PSP mode, and repeat these operations until all wired client communications are serviced.

2. The client bridge of claim 1, wherein the wired client devices require simultaneous communication with the wireless communication network.

3. The client bridge of claim 1, further comprising a scheduler having pre-defined scheduling scheme in use by the client bridge, wherein the controller will select the next wired client device based on the scheduling scheme.

4. The client bridge of claim 1, wherein the client bridge uses the MAC address of the selected next wired client device for communication with the wireless communication network instead of its own.

5. The client bridge of claim 4, wherein the client bridge associates with the wireless communication network as a wireless device using the MAC address of the selected next wired client device.

6. The client bridge of claim 1, wherein the next wired client device and wireless communication network exchange data packets through the client bridge that waits a sufficient amount of time to complete the exchange of data packets.

7. The client bridge of claim 6, wherein the exchange operation of the client bridge includes packets buffered in a buffer on behalf of that selected next wired client for the wireless communication network and packets buffered by an access point of the wireless communication network for that selected next wired client device.

8. A client bridge between a wired and wireless communication network, comprising:
   a radio transceiver;
   a hardware register of the radio transceiver; and
   a controller coupled to the radio transceiver, wherein the controller is operable to direct the radio transceiver to indicate to the wireless communication network that all wired client devices of the wired communication network requiring simultaneous communication with the wireless communication network are in Power Save Polling (PSP) mode, select the next wired client to be in Continuously Awake Mode (CAM) mode, store the Media Access Control (MAC) address of only that next wired client in the register, direct the radio transceiver to indicate to the wireless communication network that the next wired client is in CAM mode, wherein the radio transceiver is operable to receive any packets from the wireless communication network addressed to the next wired client, acknowledge the received packets using an acknowledgement generated in the register, exchange packets between the next wired client device and an access point of the wireless communication network, including any packets buffered in the buffer (108) on behalf of that next wired client and any packets buffered by the access point of the wireless communication network, and wherein the controller is also operable to direct the radio transceiver to indicate to the wireless communication network that the next wired client is back in PSP mode, and repeat these operations until all wired client communications are serviced.

9. A method for bridging clients between a wired and wireless communication network, the method comprising the steps of:
   indicating to a wireless communication network that all wired client devices are in Power Save Polling (PSP) mode;
   selecting the next wired client to be indicated to the wireless communication network as being in Continuously Awake Mode (CAM) mode;
   storing the Media Access Control (MAC) address of only that next wired client in a radio hardware register of the client bridge;
   indicating to the wireless communication network that that next wired client is in CAM mode;
   receiving any packets from the wireless communication network having the MAC address of the selected next wired client device;
   acknowledging those received packets using an acknowledgement generated in by the radio hardware register to the wireless communication network;
   indicating to the wireless communication network that the next wired client is now in PSP mode; and
   repeating the above steps until all wired client communications are serviced.

10. The method of claim 9, wherein the wired client devices require simultaneous communication with the wireless communication network.

11. The method of claim 9, wherein selecting includes selecting based on a pre-defined scheduling scheme in use by the client bridge.

12. The method of claim 9, wherein selecting includes the client bridge using the MAC address of the selected next wired client device for communication with the wireless communication network instead of its own.

13. The method of claim 9, wherein the step of indicating to the wireless communication network that that next wired client is in CAM mode includes the client bridge associating with the wireless communication network as a wireless device having the MAC address of that selected next wired client device.

14. The method of claim 9, wherein the acknowledging step includes exchanging packets between the selected next wired client device and the wireless communication network, including any packets buffered in the access point for the next wired client device and any packets buffered in the client bridge buffer for delivery to the wireless communication network.

15. The method of claim 14, wherein exchanging includes waiting a sufficient amount of time to complete the exchange of data packets.

* * * * *